United States Patent
Russell

(10) Patent No.: US 6,773,607 B2
(45) Date of Patent: Aug. 10, 2004

(54) BALLAST WATER TREATMENT FOR EXOTIC SPECIES CONTROL

(76) Inventor: Larry Russell, 200 Martinque Ave., Tiburon, CA (US) 94920

( * ) Notice: Subject to any disclaimer, the term of this patent is extended or adjusted under 35 U.S.C. 154(b) by 93 days.

(21) Appl. No.: 10/007,707

(22) Filed: Nov. 6, 2001

(65) Prior Publication Data

US 2003/0029811 A1 Feb. 13, 2003

Related U.S. Application Data

(60) Provisional application No. 60/246,427, filed on Nov. 6, 2000.

(51) Int. Cl.[7] .................................................. C02F 1/76
(52) U.S. Cl. .................... 210/747; 114/125; 210/752; 210/754; 210/756; 210/757; 210/758; 210/764; 422/37
(58) Field of Search .................... 210/752, 753–757, 210/758, 764, 747; 422/28, 37; 114/74 R, 125

(56) References Cited

U.S. PATENT DOCUMENTS

| | | | |
|---|---|---|---|
| 4,554,261 A | 11/1985 | Gergely et al. ............... 502/62 |
| 4,614,595 A * | 9/1986 | Azzarella et al. ............. 210/754 |
| 5,023,012 A | 6/1991 | Buchan et al. ............... 25/181 |
| 5,082,573 A * | 1/1992 | Goldstein et al. ............ 210/749 |
| 5,192,451 A * | 3/1993 | Gill .......................... 210/755 |
| 5,227,053 A | 7/1993 | Brym ......................... 210/143 |
| 5,348,664 A * | 9/1994 | Kim et al. ................... 210/746 |
| 5,464,636 A | 11/1995 | Hight et al. ................. 424/661 |
| 5,575,945 A | 11/1996 | Perlman ...................... 252/176 |
| 5,578,116 A * | 11/1996 | Chang ........................ 96/194 |
| 5,919,374 A * | 7/1999 | Harvey et al. ............... 210/753 |
| 5,932,112 A | 8/1999 | Browning, Jr. et al. ....... 210/750 |
| 6,080,316 A * | 6/2000 | Tonelli et al. .............. 210/652 |
| 6,125,778 A * | 10/2000 | Rodden ....................... 114/74 R |
| 6,221,262 B1 * | 4/2001 | MacDonald et al. ........... 210/757 |
| 6,419,879 B1 * | 7/2002 | Cooper et al. ............... 422/14 |
| 6,500,345 B2 * | 12/2002 | Constantine et al. .......... 210/747 |
| 6,613,232 B2 * | 9/2003 | Chesner et al. .............. 210/650 |

FOREIGN PATENT DOCUMENTS

JP     404322788 A     11/1992     .................. 210/209

* cited by examiner

*Primary Examiner*—Peter A. Hruskoci
(74) *Attorney, Agent, or Firm*—Karry W. Wang; Law Offices of Karry W. Wang

(57) ABSTRACT

Systems and methods for effectively and economically annihilating non-indigenous marine species and pathogenic bacteria in ship ballast water. A preferred embodiment comprises adding a killing agent to ballast water tanks and subsequently adding a reducing agent to the container. Oxygen is subsequently introduced to the ballast water to eliminate any excess reducing agent, and to ensure compliance with the dissolved oxygen discharge requirements of the receiving water.

21 Claims, 2 Drawing Sheets

Table 2. Results of Trial Exposure of San Francisco Bay Zooplankton to ExoStop™

| | 5-minute exposure | | | | | | 30-minute exposure | | | | | | 60-minute exposure | | | | | |
|---|---|---|---|---|---|---|---|---|---|---|---|---|---|---|---|---|---|---|
| | Control | | 10 ppm ExoStop™ Rep A | | 10 ppm ExoStop™ Rep B | | Control | | 10 ppm ExoStop™ Rep A | | 10 ppm ExoStop™ Rep B | | Control | | 10 ppm ExoStop™ Rep A | | 10 ppm ExoStop™ Rep B | |
| | alive | dead | alive | dead | alive | dead | alive | dead | alive | dead | alive | dead | alive | dead | alive | dead | alive | dead |
| Holoplankton | | | | | | | | | | | | | | | | | | |
| Copepods | | | | | | | | | | | | | | | | | | |
| Large (3 mm) calanoids (*Calanus*) | X | | | X | | X | | X | | X | | X | | X | | X | | X |
| *Small (1.2 mm) calanoids (*Acartia*) | X | | | X | | X | | X | | X | | X | | X | | X | | X |
| *Small cyclopoids | X | | | X | | X | | X | | X | | X | | X | | X | | X |
| *Immature copepodids | X | | | X | | X | | X | | X | | X | | X | | X | | X |
| *Nauplii | X | | | X | | X | | X | | X | | X | | X | | X | | X |
| Chaetognaths | | | | | | | X | | | | | | X | | | | | |
| Ctenophores | | | | | | | X | | | | | | | | | | | |
| Mysid juveniles | | | | | | | | | | | | | X | | | | | |
| Meroplankton | | | | | | | | | | | | | | | | | | |
| Barnacle nauplii | X | | | X | | X | X | | | X | | X | X | | | X | | X |
| Barnacle cypris | | | | | | X | | | | | | | X | | | | | |
| Juvenile cumaceans | | | | | | | | | | | | | X | | | | | |
| Crab zoeae | X | | | | | | | X | | X | | | X | | | X | | X |
| Shrimp zoeae | X | | | | | | | X | | X | | | | | | | | |
| Shrimp adult (*Heptacarpus cristatus*) | | | X | | | | | | X | | | | | | | | | |
| Amphipod larvae | | | X | | | | | | X | | | | | | | | | |
| Fish larvae | | | | | | | | | | | | | | | | | | |
| Polychaete larvae | X | | | X | X | | | | | | X | | X | | X | | | X |
| Hydroid polyps | X | | | | | | | | | | | X | | X | | | | X |

*Numerically dominant animals — combined abundance ca. 3,000 individuals per liter.

FIG. 4

BALLAST WATER TREATMENT FOR EXOTIC SPECIES CONTROL

CROSS-REFERENCE TO RELATED APPLICATIONS

This application claims the benefit of U.S. Provisional Application No. 60/246,427 filed Nov. 6, 2000.

FIELD OF THE INVENTION

This invention relates generally to water treatment systems and methods and, more particularly, to systems and methods for treating ship ballast water to eliminate non-indigenous marine animals in the ballast water.

BACKGROUND OF THE INVENTION

Global shipping moves 80 percent of world commodities. When ships load and/or remove their cargo, it is necessary to counteract the weight imbalance with ballast water in order for the ship to load and travel safely. In addition to maintaining a ship's weight balance and stability, ballast water is carried by ships to adjust a vessel's trim for optimal steering, propulsion, and safety. Ballasting fulfills many other functions including: reducing stresses on the hull of the ship, providing for transverse stability, aiding propulsion by controlling the submergence of the propeller, assisting maneuverability by submerging the rudder and reducing the amount of exposed hull surface (freeboard or windage), and compensating for weight lost from fuel and water consumption. (*Stemming the Tide: Controlling Introductions of nonindigenous Species by Ship's Ballast Water*, 1996). The use of ballast water varies among vessel types, among port systems, and according to cargo and sea conditions. Ballast water often originates from ports and other coastal regions, which are rich in planktonic and other organisms. It is variously released at sea, along coastlines, and in port systems. As a result, a diverse mix of non-native or exotic organisms is transported and released around the world with the ballast water of ships.

Generally, many of the species of organisms contained in ballast water are either non-native or potentially pathogenic when they are released into the receiving water of the port. The transfer of organisms in ballast water has resulted in the unintentional introduction of tens to hundreds of nonindigenous freshwater and marine species to ports around the world. The invasion of these non-indigenous aquatic organisms has had tremendous detrimental impacts on native ecosystems and continues to cost billions of dollars in remedial actions. For example, the ballast-mediated introduction of the zebra mussel in the U.S. Great Lakes during the 1980s is expected to cost that region over $5 billion. Other examples include the introduction of toxic dinoflagellates in Australia and that of the Asian claim (Potamocorbula Amurensis) in the San Francisco Bay-Delta region. According to the U.S. Coast Guard, " . . . ballast water from ships is one of the largest pathways for the intercontinental introduction and spread of aquatic nuisance species." (http://www.uscg.mil/hq/g-m/mso/mso4/bwm.html, July 2000).

Ballast water amounts are extremely large, especially for non-cargo ships. For example, large tankers can carry in excess of 200,000 $m^3$ of ballast water and rates of pumping can be as high as 15,000 to 20,000 $m^3/h$. It is estimated that more than 3,000 species of plants and animals are transported daily in ballast water. (Office of Technology Assessment, 1993). The most common plants carried in ballast water are phytoplankton, especially diatoms and dinoflagellates, and floating detached plants, including seaweed (algae) and seagrasses (eelgrass or turtlegrass). Zooplankton found in ballast is diverse and dense.

TABLE 1

Average Water Ballast Carried by Ships Average amount of ballast water (in gallons per ship) in ships arriving at United States and San Francisco Estuary ports from foreign ports

| Ship Type | U.S. Average (gals) | SFBD Estuary Average (gals) |
|---|---|---|
| Ships in Ballast | | |
| Bulk Carriers | 3,800,000 | 1,670,000 |
| Container Ships | —* | —* |
| Tankers | 3,170,000 | 2,370,000 |
| All 3 Ship Types | 2,720,000 | 1,840,000 |
| Ships in Cargo | | |
| Bulk Carriers | — | 1,670,000 |
| Container Ships | 1,380,000 | 1,380,000 |
| Tankers | — | 640,000 |
| All 3 Ship Types | — | 1,380,000 |
| All Ships | | |
| Bulk Carriers | All Ships 3,000,000 | 1,670,000** |
| Container Ships | 1,380,000 | 1,380,000** |
| Tankers | 900,000 | 1,000,000** |
| All 3 Ship Types | 1,580,000 | 1,410,000** |
| | Unpumpable Ballast | |
| Bulk Carriers | 18,000 | — |
| Container Ships | 38,000 | — |
| Tankers | 22,700 | — |
| All 3 Ship Types | 24,500 | — |

Source: Carlton et al. 1995, page 77
*Container ships rarely sail without cargo, and thus do not arrive in ballast
**The quantities of ballast water discharged by these types of ships entering the Estuary, calculated from data in US Coast Guard 1996 are as follows:
Bulk Carriers    1,730,000 gallons
Container Carriers 1,270,000 gallons
Tankers          2,760,000 gallons
All 3 ship types  1,520,000 gallons Differences in volume are due to available data used in the calculations.

Presently, open ocean ballast water exchange (BWE) is the only method in use for reducing exotic introductions via ballast water. Ballast water exchange involves replacing coastal water with open-ocean water that is located at least 200 miles offshore during a voyage. This process may reduce the density of coastal organisms in ballast tanks that may be able to invade a recipient port, replacing them with oceanic organisms with a lower probability of survival in nearshore waters.

Ballast water exchange is recommended as a voluntary measure by the International Maritime Organization (IMO). In addition, the Nonindigenous Aquatic Nuisance Prevention and Control Act of 1990 (P.L. 101–646) required that all vessels entering Great Lakes Ports from beyond the exclusive economic zone (EEZ—out to 200 miles from shore) undergo ballast exchange or some comparably effective ballast treatment which conforms to discharge requirements of the Federal Water Pollution Control Act (33 U.S.C. 1251). These requirements were extended to vessels arriving in ports of the upper Hudson River, north of the George Washington Bridge on Nov. 4, 1992, and now apply to all vessels entering U.S. waters.

The National Invasive Species Act (NISA) of 1996 (P.L. 104–332) reauthorized and amended the Nonindigenous Aquatic Nuisance Prevention and Control Act of 1990. NISA issued mandatory ballast management reporting and voluntary ballast exchange guidelines to all vessels that enter U.S. waters from outside the EEZ, with the exception of military vessels, crude oil tankers that carry out coastwise trade, and some passenger ships that are equipped with ballast water treatment systems.

There are two approved methods of open-ocean exchange: empty/refill and flow through. The empty/refill method consists of the ballast tanks being emptied and subsequently refilled. This process compromises the stability of the ship; therefore ships traveling in rough seas will not be able to use this method. Stability can be managed more easily with ships that have a higher number of small volume ballast tanks, rather than a low number of large volume ballast tanks, although the ability to safely conduct ballast water exchange still depends upon weather and sea surface conditions. The flow through method consists of pumping ballast water (three times the capacity of the ballast tank) through the tanks, allowing it to overflow through air vents of deck hatches. Stability is less of an issue during this process, but the integrity of the ship is still compromised. Additional safety hazards associated with this method include potential tank over pressurization and water overflowing on the deck. Thus, it is not always possible to perform an exchange. Furthermore, both of the approved ballast water exchange methods only reduce the density of coastal organisms in ballast tanks following an exchange. There are still some residual coastal organisms in the tanks, so these methods are only partly effective.

The exchange efficiency for both methods has been estimated to range from 75–95 percent in a variety of studies on specific biological species, usually depending on the structure of the ballast tanks (e.g., placement of intake and outflow pipes, shape of tanks, size of baffles in tanks, etc.). Although open-ocean exchange significantly reduces the risk of invasion, the remaining 5–25 percent still posses a significant threat. Another disadvantage is that open-ocean exchange cannot be achieved during coastal voyages, where the ship never leaves the EEZ.

An alternative to open-ocean exchange is ballast water treatment, where organisms in the water are killed or removed from the ballast water. An effective ballast water treatment system must meet the following criteria: it must be practical for mariners to operate, safe for mariners and the ship, easy to monitor, cost effective, biologically effective and have a minimal environmental impact (i.e. not discharging toxic chemical byproducts). Until now, it has been challenging for researchers to come up with a system that meets the all of these criteria.

Treatment of ballast water can take place during uptake, in transit (in the ballast tank), during discharge, or on a mobile or onshore treatment system/plant. There are many different options that are being explored today including filtration, UV irradiation, hydrocyclonic separation, thermal treatment, biocides, and more. Many projects are pairing two different kinds of treatment technologies (i.e. filtration and UV) to gain a higher efficiency across all taxonomic groups of organisms.

The current treatment approaches that are being explored suffer a variety of flaws. Most of them have no techniques available for routine analysis to determine effectiveness. Additionally, approaches like filtration will be impacted by oil and particulates and by the need for the disposal of the backwash stream (presumably back into the harbor where the ballasting is being done but it is uncertain how this concern would be addressed). Oil would rapidly clog any kind of filtration device. The more sophisticated approaches involving the use of ultra violet (UV) irradiation will also be immediately impacted and likely shut down by the oil and rendered ineffective by particulates. Non-degradable biocides seem to offer very little hope in this application due to the potential toxicity of the discharge.

Therefore, there exists a need for a more effective system for managing ballast water. This system must be practical for mariners to operate, safe for mariners and the ship, easy to monitor and analyze, cost effective, biologically effective and have a minimal environmental impact.

SUMMARY OF THE INVENTION

This invention provides systems and methods for treating ballast water to effectively and economically annihilate non-indigenous marine animals in the ballast water. In the preferred embodiment, sufficient amounts of a killing agent and a reducing agent are added sequentially and separately to a ballast water container. A killing agent, such as a chloramine, rapidly annihilates most or all of the non-indigenous macro and micro-organisms in the ballast water. The subsequent addition of the reducing agent transforms the toxic chloramine into non-toxic by-products, and creates an anoxic environment wherein any remaining organisms, which, although highly unlikely, could possibly have survived the chloraminesare, are exposed to conditions that cannot support life. Suitable reducing agents include solid-state agents such as activated carbon and liquid chemical reducing agents, such as sodium thiosulfate, sodium sulfite, sodium dithionite, sodium bisulfite, or sulfur dioxide. Preferably, oxygen is added subsequent to the addition of the reducing agent to remove any excess reducing agent and to provide dissolved oxygen for aquatic species in the receiving water. In all embodiments, treatment of the ballast water can take place during uptake, in transit in the ballast container, immediately before or during discharge, or on a mobile or onshore treatment system or plant, and can be accomplished either automatically or manually.

The treatment system can either be ship board mounted or mounted on a barge which is brought next to the ship for treatment, depending upon the degree of treatment needed and the volume of ballast water requiring treatment. The concentration or residual of the killing agent, the reducing agent, and the oxygen can be easily monitored with low cost devices such as hand-held Hach kits or simple swimming pool analyzers.

BRIEF DESCRIPTION OF THE DRAWINGS

The foregoing and other features, aspects, and advantages of the present invention will become more apparent from the following detailed description when read in conjunction with the following drawings, wherein:

FIG. 4 summarizes the results of an empirical study of the present invention.

DETAILED DESCRIPTION

Figure 1A:
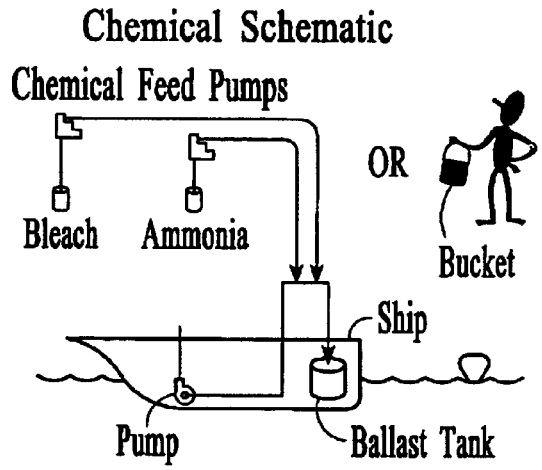
FIG. 1A is a chemical schematic in accordance with an embodiment of the present invention.
Figure 1B:
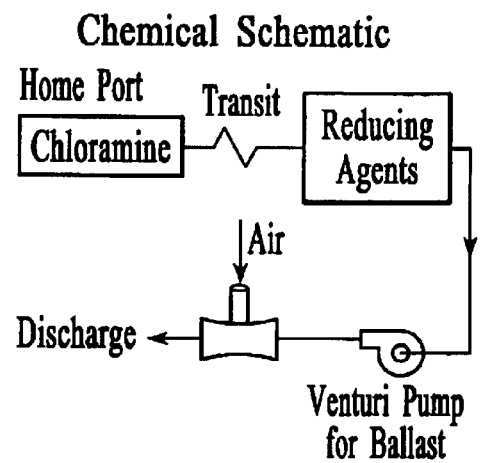
FIG. 1B is a chemical schematic in accordance with an embodiment of the present invention.

The present invention provides systems and methods for effectively treating ballast water to eliminate introduction of non-indigenous aquatic species into coastal waters. The preferred embodiment of this invention comprises a two-step annihilation of most or all of the exotic or foreign biota in ballast water. As shown in FIGS. 1A and 1B, which will be discussed in greater details below, the key elements of the present invention are to provide for killing of the organisms by using sufficient amount of a killing agent, and then to provide for rapid destruction of the killing agent with a reducing agent that creates anoxic conditions with sufficient levels of reduction (e.g., redox potential at −400 to −600 mv) to ensure that no oxygen is present. This approach ensures that, even in the very unlikely event that biota survived the dose of the killing agent, the biota of concern would be readily killed in the anoxic conditions.

There are five distinct types of biota that are of concern:

1) bacteria and viruses;
2) phytoplankton;
3) zooplankton;
4) neckton; and
5) benthic organisms All of these species can be killed by the use of a chloramine or bromamine. Chloramines result from the reaction of chlorine and ammonia to form compounds (e.g., mono-chloramine $NH_2Cl$ or dichloramine $NHCl_2$) that are non-oxidizing, very stable and extremely toxic to marine organisms. The preferred starting materials are high test hypochlorite (HTH) and ammonium chloride. All killing mechanisms follow Chick's Law, which is known in the art, and which states (in differential form) the following:

$$dN/dt = -kN_t$$

where $N_t$=numbers of organisms at time t;

t=time, usually in seconds; and k=reaction constant (i.e., kill rate), $sec^{-1}$ whose integral form is $N_t/N_0 = e^{-kt}$; and in the logarithmic form, $Log(N_t/N_0) = -kt$. In other words, the kill of organisms is an exponential decay function of the concentration and effectiveness of the killing agent and the length of contact time. This equation has been further advanced into its current form kt~CT, wherein it is referred to as the CT, which has been observed to model the conditions for achieving a degree of killing of organisms at time T, with a biocide concentration of C, which is usually expressed in mg/l. Each organism has a corresponding CT value that determines, for example, how much of the killing agent would have to be added to the ballast water to kill the organism in a given amount of time, or how long the organism would have to be exposed to a given concentration of a killing agent to provide for a given percent reduction of that organism. Simply stated, for a given killing ratio of the organism, as the dosage of the killing agent (C) is increased, the time (T) required for killing the organism goes down. Therefore, if the CT of the most resistant organism is met, all biota with less resistance will also be eradicated.

Zooplankton are primarily larval states of much larger marine animals that are the species of primary concern with respect to introduction of exotic species and the resulting ecosystem imbalance. All zooplankton have gills or the equivalent of gills (e.g., oxygen permeable skins). Chloramines are extremely toxic to marine species with gills. Chloramines are also quite effective against phytoplankton, other exotic species, bacteria, viruses, and spores or cysts.

Referring to FIG. 1A, the addition of a chloramine or chloramines to the ballast water is preferably done immediately before or at the time the transit begins to achieve the longest possible contact time. In transit, the concentration of chloramine can be easily measured, monitored, and adjusted, if necessary. Chloramines do not cause corrosion of the steel tanks, pumps or piping used onboard ships. In general, however, it is impractical to use a preformed chloramine solution as it is difficult to control the molar ratio of more concentrated solutions during mixing. Preferably, therefore, instead of using a preformed chloramine solution, aqueous ammonia and sodium hypochlorite (i.e., bleach) in the correct ammonia-chlorine stoichiometric weight ratio are each added to the ballast water to form a dilute chloramine solution in the ballast water container. In addition to aqueous ammonia and sodium hypochlorite, chloramine can be made from reacting gaseous ammonia, ammonium chloride, urea, or ammonium nitrate, with calcium hypochlorite (or solid HTH—high test hypochlorite), on-site electrolytic decomposition of water to form chlorine, and gaseous chlorine, etc. Bromamine can also be used in place of chloramine, and can be made from the same ammonia sources described above and a bromine solution or solid brominated tablets.

Still referring to FIG. 1A, the ammonia and sodium hypochlorite are preferably added automatically and flow proportionally during ballast water filling by a chemical injection pump or a side stream chemical addition system. The ammonia and the chlorine can also be added with a tethered floating tablet chemical feeder located within the ballast water tanks which would be recharged by a shipboard operator or with a side stream tablet feeder. Alternatively, the solution can be added automatically either prior to or after filling. In addition to a chemical injection pump, any means known in the art can be used for the addition of the killing agent. For example, the chlorine and ammonia can be added manually to the ballast tank prior to of after filling, as shown in FIG. 1A. The operation of the engine and the transit of the ship ensure that the chloramine solution would be well mixed in the ballast tank. The chloramine residual dosage is typically on the order of 1–20 ppm. Holding a residual of the appropriate concentration will automatically adjust for variations in the concentration of non-indigenous marine species in the ballast water tank, the contact time available, and the chlorine demand. Most importantly, a minimum CT of 25–75 should be maintained for a successful elimination of the non-indigenous planktonic organisms. A CT of 45–55 is more preferable and a CT of 50 is most preferable. Using a CT of 50 as the standard, therefore, 50 minutes of contact time would be required if a 1 ppm chloramine solution is used, and only 2.5 minutes of contact time would be required if a 20 ppm chloramine is used.

To inactivate cysts of organisms, such as the very resistant and pathogenic cryptospirdium parvum, a CT of 7,200 is required for either chlorine or chloramines. Thus, when the concentration C=10 ppm of chloramines, then a detention time of 720 minutes or 6 hours is required. That is, a total disinfection of the ballast water could be accomplished in approximately 6 hours at 10 ppm (or, e.g., approximately one hour at 120 ppm of chloramine). At this level of CT, all biota of concern would be completely disinfected or killed. In other words, the killing of more resistant organisms, such as viruses or cysts, are achieved by simply holding the treated ballast water in place for a longer time.

In general, chlorine and chloramines are equal in killing power but chloramines are superior in performance in providing reliable disinfection for long periods of time. With respect to bacteria and cyst destruction, chloramines may take longer to achieve the same level of kill as chlorine. However, with respect to planktonic kill, chloramines are far superior to chlorine due to their severe and immediate toxicity to those species with gills or membrane breathing facilities. Chloramines act as a "silver bullet" to directly and specifically attack the biota without attacking the multiple chemical species also existing in the water being used for ballast. Therefore, chloramines are far more effective than chlorine, because chloramines do not attempt to oxidize every chemical in sight, as does a non-discriminant oxidant such as chlorine. It is clear that while biota exist in numbers of approximately 1,000 to 100,000 per liter or so, chemical species exist at levels of $10^{21}$ molecules per liter. When non-discriminant oxidants, such as chlorine, are added to ballast water, the number of organisms are miniscule (less than 1 organism/100,000,000,000,000,000 molecules of chlorine) compared with the number of the molecules of the constituents in the ballast water, which are in the same order as those of the disinfectant added. Thus, if the disinfectant does not discriminate in its reaction, most of its chemical power is wasted on oxidizing the chemicals in the ballast water. On the other hand, chloramines directly attack the biota (where there is a ratio of approximately 100,000,000, 000,000,000 molecules of chloramines per organism). The killing effect of chloramines is therefore millions of time more effective than an oxidant like chlorine. The other significant advantage of chloramines is that there are essentially no disinfection byproducts in the solution and therefore no residual toxic or health related effects released to the environment with the treated water.

Prior to discharging into the harbor, the ballast water is further treated to eliminate the killing agent. Turning now to FIG. 1B, an induced chemical reducing agent such as sodium thiosulfate, sodium sulfite, sodium bisulfite, sulfur dioxide or sodium dithionite, is added in sufficient quantities to eliminate the chloramines and remove all oxygen. These reducing agents can be added in a flow proportion method wherein the reducing chemical is either pumped in during discharge or added manually to the ballast tanks within an hour or so of discharge. The addition of the reducing agent decomposes the chloramine into harmless byproducts, and the reducing agent would reduce the dissolved oxygen.

Using sodium thiosulfate as the reducing agent, the reduction reactions are as follows:

where the killing agent is a chloramine, and the weight ratio of monochloramine to sodium thiosulfate is 1 to 1.18, or approximately 1 to 1.2;

where the killing agent is a bromamine, and the weight ratio of monobromamine to sodium thiosulfate is 1 to 2.2,

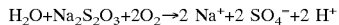

where oxygen is eliminated (weight ratio of sodium thiosulfate to oxygen is approximately 1 to 0.4.

Thus, if the dose of chloramine were 10 ppm, then the dose of sodium thiosulfate would be approximately 12 ppm (at 0 ppm dissolved oxygen) to 15 ppm (at 8 ppm of dissolved oxygen) and 17.5 ppm (at 15 ppm of dissolved oxygen). The range of dissolved oxygen in natural waters is 0 to 10 ppm with a maximum under special circumstances of up to 15 ppm. For example, for a dose of 10 ppm of chloramines and 8 ppm of a dissolved oxygen (i.e., level of normal saturation of oxygen in natural waters), the amount of sodium thiosulfate needed would be:

1.2(10 ppm)+0.4(8 ppm)=15.2 ppm

Similar calculations could be easily made for other reducing agents, but all reducing agents will have similar dose ranges of approximately of 1.5 times the dose of the killing agent. These reduction reactions are instantaneous, making conditions impossible for the biota to survive in the ballast water.

Figure 2:
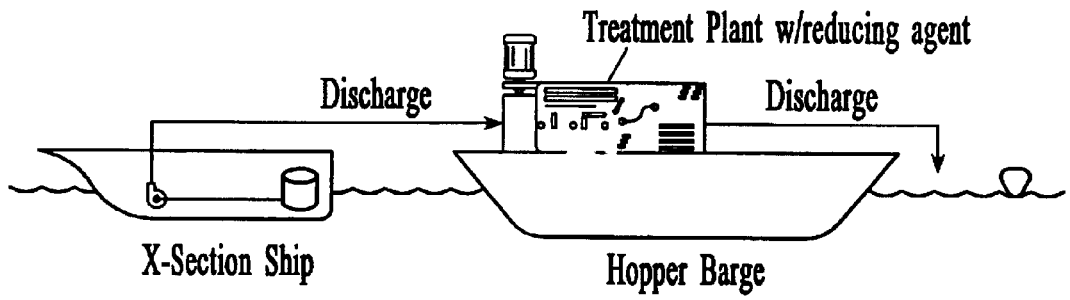
FIG. 2 illustrates an embodiment of the present invention.

More preferably, however, the reducing agent is added either to the ballast tank or to the discharged water, which is then pumped into a hopper barge brought alongside of the ship during de-ballasting, as shown in FIG. 2. This method provides a two step approach wherein the chloramine would have killed the biota, and in the very unlikely event that any biota survived, the period of total anoxia resulted from the addition of the reducing agent would ensure that the gilled marine animals would be readily killed by the lack of oxygen. Preferably, the barge retention time is on the order of 5–15 minutes, after which most or all species would be killed, although longer retention time may be used in more extreme circumstances. The reduction or oxygen will also essentially eliminate corrosion by removing the oxidizing agent (oxygen) from the ballast water.

Figure 3:
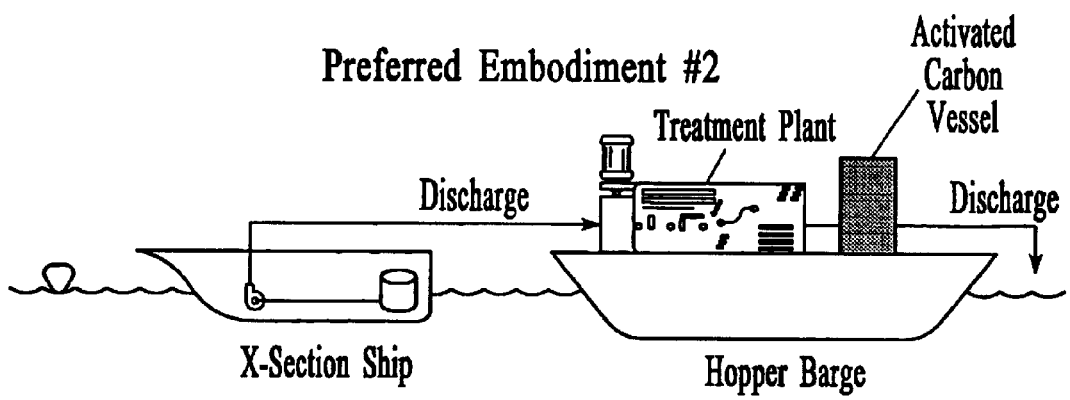
FIG. 3 illustrates an embodiment of the present invention.

In another preferred embodiment, activated carbon is used as the reducing agent. Activated carbon in a pressure vessel is used at full standard discharge flow rates. The activated carbon vessels can be on board or mounted on an adjacent barge, as shown in FIG. 3. Activated carbon has an essentially infinite capacity for reducing chloramines.

Dissolved oxygen can be rapidly and economically added by venturi injection or by compressed aeration of the barge or the ballast tanks to remove any excess chemical reducing agent, thus rendering the ballast water suitable for discharge into the receiving water.

The residual of the chloramines at the time of introduction, during transit, upon arrival and following introduction of the reducing agent can be easily monitored with low cost hand held Hach-type kits or swimming pool kits (colorimetric). Additionally, upon arrival the dissolved oxygen can be monitored upon discharge with similar simple hand held instruments.

In addition to the shipboard mounted treatment systems and the part shipboard and part barge mounted treatment systems described above, the entire treatment system may be mounted on a hopper barge. A treatment barge allows for the treatment of ballast water completely off of the ship without any impact on the operations onboard the ship. The barge would provide for both chemical treatment and for sufficient storage to ensure that adequate detention time is provided at the discharge flow rate to achieve complete annihilation of exotic species.

In operation, the ship with ballast on board would moor to the barge which would be anchored or moored to a pier. The ship would then begin to discharge its ballast water to the barge holding tanks. The ammonia and then the chlorine would be added continuously and within a few feet of one another along the pipeline into the ballast water at a concentration which would achieve the required CT for a desired contact time.

The ballast water would be discharged from the ship into the barge tanks on a continuous basis after the initial CT conditions were met. The ballast water would be retained on the barge, treated with the killing agent, treated with the reducing agent, reoxygenated, and then discharged over the side to the receiving water.

EXAMPLE

Marine plankton were exposed to ExoStop™, a monochloramine solution, to determine its efficacy as an agent to sterilize ship ballast water for destruction of exotic species in ship ballast water.

Methods

Marine plankton were collected from San Francisco Bay near the end of the Berkeley Pier with a 0.165 mm mesh nylon plankton net. The plankton in this area should be representative of those in the San Francisco Bay, which has been acknowledged as the body of water with the highest degree of exotic species contamination. Short (ca. 50-foot) oblique tows were made with a 30-cm diameter conical net, and the contents were transferred to plastic carboys of bay water. As the density of zooplankton at the collection site was less than 10 individuals per liter, it was necessary to concentrate the plankton to ensure that adequate numbers were included in the experimental vessels. Ten tows were placed in each of two 5-gallon carboys for transportation to the laboratory. This resulted in a concentration factor of roughly 500 times.

The carboys were allowed to stand in an unheated laboratory overnight, and were carefully decanted into a large mixing vessel. This step ensured that only actively-swimming survivors were used for the test. The contents of the mixing vessel were gently stirred to keep the plankton uniformly distributed, and the water was apportioned into nine plastic beakers. Each beaker received 2,000 ml. One concentration (10 ppm) of ExoStop™ was tested. Three exposure times (5-, 30-, and 60-minutes) were tested. Each exposure time had one beaker which did not receive ExoStop™ (control) and two which received ExoStop™ (Replicates A and B). Salinity, temperature, and dissolved oxygen were measured at the beginning of the exposure with a Hydrolab.

At the end of the exposure time, zooplankton were removed from each beaker by filtering through 0.050 mm mesh nylon nets and the concentrated samples were washed into a petri dish to which a few drops of a vital stain, Neutral Red, were added. A vital stain is a stain which is incorporated by living tissue, but which is not incorporated into dead tissue. The samples were exposed to the stain for one hour, during which time observations were made with a dissecting microscope, noting movement of animals and the incorporation of stain. At the end of the staining period, samples were preserved with formalin.

Results

The test water had a salinity of 28.4 ppt (roughly 85 percent as salty as the open sea), dissolved oxygen was near saturation, and the temperature of the experimental beakers was 11° C. (Table 1).

TABLE 1

Methodological Details of Trial Exposure of San Francisco Bay Zooplankton to ExoStop ™

| | |
|---|---|
| Salinity, parts per thousand | 28.4 |
| Dissolved Oxygen, ppm | 9.0 |
| Temperature, C. | 11.1 |
| Volume of experimental beakers | 2,000 ml |
| Mesh size of collection net, mm | 0.135 |
| Approximate concentration factor in beakers | 500 X |

Zooplankton in the experimental beakers was numerically dominated by small (1.2 mm and smaller) copepods, primarily the calanoid Acartia, along with its immature copepodids and nauplii; and small cyclopoid copepodids. A few larger calanoids (Calanus, ca. 3 mm long) were found as well as small numbers of a dozen or so other taxa, including chaetognaths, ctenophores, mysid juveniles, barnacle nauplii and cyrpis stages, cumaceans, crab and shrimp zoeae, adult shrimp, amphipod larvae, fish larvae, polychaete larvae, and hydroid polyps (see Table 2 in FIG. 4). Most of these other taxa were represented by one to a few individuals per beaker.

Zooplankton in the control samples showed good survivorship in all three exposure times (5-, 30-, and 60-minute exposures). All animals stained well and were actively swimming.

In the 5-minute treatment all animals were motionless. The small copepods looked dead, but took up a little of the vital stain in the gut. This probably indicates that the toxicant did not have time to entirely penetrate to ingested food. Larger zooplankters, such as Calanus and shrimp zoeae, were motionless except for twitching of mouthparts and other small appendages. These stained lightly. They were undoubtedly moribund, although not yet dead. In the 30- and 60-minute exposures, all animals were motionless and took up essentially no stain.

This test shows that 10 ppm ExoStop™ kills a wide variety of marine zooplankton species, including both holo- and meroplankton, with as little as 5 minutes of exposure (at a CT of 50). The results are summarized in Table 2 (FIG. 4), which lists the zooplankton taxa which were found in each beaker.

All residuals of ExoStop™ were successfully removed by the addition of sodium thiosulfate and no residual toxicity was anticipated.

I claim:

1. A method for eliminating non-indigenous marine organisms in ship ballast water, the method comprising:
   adding sufficient amount of a killing agent to the ballast water to kill said organisms, wherein the killing agent includes a chloramine or bromamine;
   adding sufficient amount of a reducing agent to the ballast water subsequent to adding the killing agent to eliminate the killing agent; and
   reoxygenating the ballast water subsequent to adding the reducing agent to remove any excess reducing agent.

2. The method of claim 1, wherein the killing agent is a chloramine.

3. The method of claim 2, wherein the chloramine is formed in the ballast water by adding aqueous ammonia or an ammonium salt, and sodium or calcium hypochlorite to the ballast water.

4. The method of claim 3, wherein the sufficient amount of the killing agent is such that a CT of more than 25 is reached.

5. The method of claim 4, wherein the sufficient amount of the killing agent is such that a CT between approximately 45 and 55 is reached.

6. The method of claim 5, wherein the sufficient amount of the killing agent is such that a CT of approximately 50 is reached.

7. The method of claim 4, wherein the sufficient amount of the killing agent is such that a CT between approximately 7000 and 8000 is reached.

8. The method of claim 4, wherein the sufficient amount of the killing agent is such that a CT between approximately 7100 and 7300 is reached.

9. The method of claim 3, wherein the reducing agent is selected from the group consisting of sodium thiosulfate, sodium sulfite, sulfur dioxide, sodium dithionite, sodium bisulfite and activated carbon.

10. The method of claim 9, wherein the sufficient amount of the reducing agent is approximately 1.5 to 2 times the concentration of the killing agent.

11. The method of claim 10, wherein sufficient amount of the reducing agent is added to the ballast water and held for approximately 5 to 15 minutes to achieve the desired CT.

12. The method of claim 2, wherein the chloramine is formed in the ballast water by adding a solid ammonia salt and high test hypochlorite to the ballast water.

13. The method of claim 1, wherein the killing agent is a bromamine.

14. The method of claim 1, further comprising the step of discharging the ballast water to a holding tank in a barge prior to adding the killing agent and the reducing agent.

15. The method of claim 1, further comprising the step of discharging the ballast water to a holding tank in a barge after adding the killing agent but prior to adding the reducing agent.

16. A method for eliminating non-indigenous marine organisms in ship ballast water, the method comprising:

discharging the ballast water to a holding tank in a barge;

adding sufficient amount of a killing agent to the ballast water to kill said organisms, wherein the killing agent includes a chloramine or bromamine;

adding sufficient amount of a reducing agent to the ballast water subsequent to adding the killing agent to eliminate the killing agent; and reoxygenating the ballast water subsequent to adding the reducing agent to remove any excess reducing agent.

17. The method of claim 16, wherein the killing agent is a chloramine.

18. The method of claim 17, wherein aqueous ammonia or an ammonium salt, and sodium or calcium hypochlorite are used to form the chloramine in the ballast water and are added to the ballast water separately.

19. The method of claim 18, wherein the sufficient amount of the killing agent is such that a CT between approximately 45 and 55 is reached.

20. The method of claim 19, wherein the reducing agent is selected from the group consisting of sodium thiosulfate, sodium sulfite, sulfur dioxide, sodium dithionite, sodium bisulfite, and activated carbon.

21. A method for eliminating non-indigenous marine organisms in ship ballast water, the method comprising:

discharging the ballast water to a holding tank in a barge;

adding sufficient amounts of aqueous ammonia or an ammonium salt, and sodium or calcium hypochlorite to the ballast water, wherein the aqueous ammonia or ammonium salt and sodium hypochlorite are in stoichiometric proportion to produce a chloramine in the ballast water and kill said or organisms;

adding sufficient amount of a sodium bisulfite to the ballast water after the addition of aqueous ammonia or ammonium salt, and sodium or calcium hypochlorite to eliminate the chloramine; and reoxygenating the ballast water after the addition of sodium bisulfite to remove any excess sodium bisulfite.

* * * * *